United States Patent
Zhao et al.

(10) Patent No.: US 9,469,213 B2
(45) Date of Patent: Oct. 18, 2016

(54) SPATIAL DOMAIN OPTIMAL ELECTRIC AND HYBRID ELECTRIC VEHICLE CONTROL WITH PATH FORECASTING

(71) Applicant: FORD GLOBAL TECHNOLOGIES, LLC, Dearborn, MI (US)

(72) Inventors: Yanan Zhao, Ann Arbor, MI (US); Ming Lang Kuang, Canton, MI (US); Anthony Mark Phillips, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/069,628

(22) Filed: Nov. 1, 2013

(65) Prior Publication Data

US 2015/0127199 A1    May 7, 2015

(51) Int. Cl.
*B60L 11/18* (2006.01)
*B60W 10/26* (2006.01)
(Continued)

(52) U.S. Cl.
CPC .............. *B60L 11/1862* (2013.01); *B60L 3/12* (2013.01); *B60L 11/123* (2013.01); *B60L 11/14* (2013.01); *B60L 11/1816* (2013.01); *B60L 11/1861* (2013.01); *B60L 11/1868* (2013.01); *B60L 11/1877* (2013.01); *B60L 15/2045* (2013.01); *B60W 10/26* (2013.01); *B60W 20/12* (2016.01); *B60L 2210/10* (2013.01); *B60L 2210/30* (2013.01); *B60L 2210/40* (2013.01); *B60L 2240/12* (2013.01); *B60L 2240/14* (2013.01); *B60L 2240/642* (2013.01); *B60L 2240/645* (2013.01); *B60L 2260/50* (2013.01); *B60L 2260/52* (2013.01);
(Continued)

(58) Field of Classification Search
CPC ............. B60L 11/1862; B60W 10/26; B60W 20/104; B60W 2510/244; B60W 2530/18; B60W 2710/244
USPC .......................................... 701/22; 180/65.21
See application file for complete search history.

(56) References Cited

U.S. PATENT DOCUMENTS 6,005,494 A    12/1999  Schramm
6,687,581 B2    2/2004  Deguchi et al.
(Continued)

FOREIGN PATENT DOCUMENTS

WO    2009129106 A1    10/2009

OTHER PUBLICATIONS

G. E. Katsargyri et al., "Path Dependent Receding Horizon Control Policies for Hybrid Electric Vehicles", 3rd IEEE Multi-conference on System and Control (MSC 2009), Saint Petersburg, Russia, Jul. 8-10, 2009, 7 pgs.
G. E Katsargyri et al., "Optimally Controlling Hybrid Electric Vehicles Using Path Forecasting", 2009 American Control Conference, St. Louis, Missouri, Jun. 10-12, 2009, 6 pgs.
(Continued)

*Primary Examiner* — Richard Camby
(74) *Attorney, Agent, or Firm* — David B. Kelley; Brooks Kushman P.C.

(57) ABSTRACT

A vehicle engine, electric machine and battery are operated, in certain examples, such that a predetermined route is segmented based on varying criteria to determine target battery state of charge at the segment endpoints along the route. The endpoints are a superposition of endpoints defined by predicted powertrain operating mode transitions, predicted vehicle acceleration transitions or predicted road grade transitions along the route.

5 Claims, 4 Drawing Sheets

(51) Int. Cl.
*B60L 3/12* (2006.01)
*B60L 11/12* (2006.01)
*B60L 11/14* (2006.01)
*B60L 15/20* (2006.01)

(52) U.S. Cl.
CPC .... *B60L 2260/54* (2013.01); *B60W 2510/244* (2013.01); *B60W 2530/18* (2013.01); *B60W 2550/143* (2013.01); *B60W2710/244* (2013.01); *Y02T 10/6217* (2013.01); *Y02T 10/645* (2013.01); *Y02T 10/7005* (2013.01); *Y02T 10/7044* (2013.01); *Y02T 10/7066* (2013.01); *Y02T 10/7072* (2013.01); *Y02T 10/7077* (2013.01); *Y02T 10/7216* (2013.01); *Y02T 10/7241* (2013.01); *Y02T 10/7283* (2013.01); *Y02T 10/7291* (2013.01); *Y02T 90/127* (2013.01); *Y02T 90/14* (2013.01); *Y02T 90/16* (2013.01)

(56) References Cited

U.S. PATENT DOCUMENTS

| | | |
|---|---|---|
| 7,665,559 B2 | 2/2010 | De La Torre-Bueno |
| 2005/0228553 A1* | 10/2005 | Tryon ............... 701/22 |
| 2007/0112475 A1* | 5/2007 | Koebler et al. ........... 701/1 |
| 2009/0259355 A1 | 10/2009 | Li |
| 2009/0259363 A1* | 10/2009 | Li et al. ............. 701/36 |
| 2012/0010767 A1 | 1/2012 | Phillips et al. |

OTHER PUBLICATIONS

Y. Bin et al., "Multi-Information Integrated Trip Specific Optimal Power Management for Plug-In Hybrid Electric Vehicles", 2009 American Control Conference, St. Louis, Missouri, Jun. 10-12, 2009, 7 pgs.

* cited by examiner

SPATIAL DOMAIN OPTIMAL ELECTRIC AND HYBRID ELECTRIC VEHICLE CONTROL WITH PATH FORECASTING

TECHNICAL FIELD

The present disclosure is related to the management of fuel consumption in a hybrid electric vehicle.

BACKGROUND

A Hybrid Electric Vehicle (HEV) operates by buffering fuel energy by using the internal combustion engine to turn a generator; the electricity generated is stored in a battery. HEV systems can also recover kinetic energy by using the momentum of the vehicle to turn the generator; the electricity generated is then stored in a battery. Fuel is the predominate source of energy in an HEV system. Plug-in Electric Hybrid Vehicles (PHEVs) are an extension of existing hybrid electric vehicles (HEVs) with added energy flexibility. A PHEV utilizes a larger capacity battery pack than a standard HEV and the PHEV has two sources of energy, fuel and electricity from the electric utility grid.

An objective of the HEV control system is to minimize energy operational costs and emissions without compromising the vehicle drivability and system constraints. A standard Energy Management Control (EMC) strategy is traditionally designed to operate the HEV in electric drive mode in which the vehicle is operating only the electric motor to maximize the battery power output in blended operation mode, which is when the vehicle is operating both the engine and the electric motor.

SUMMARY

A hybrid electric vehicle may include a powertrain and at least one controller. The at least one controller may operate the powertrain according to a battery state of charge profile of a predetermined route determined by predictive route segmentation based on predicted powertrain operating mode transitions, acceleration transitions or road grade transitions.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
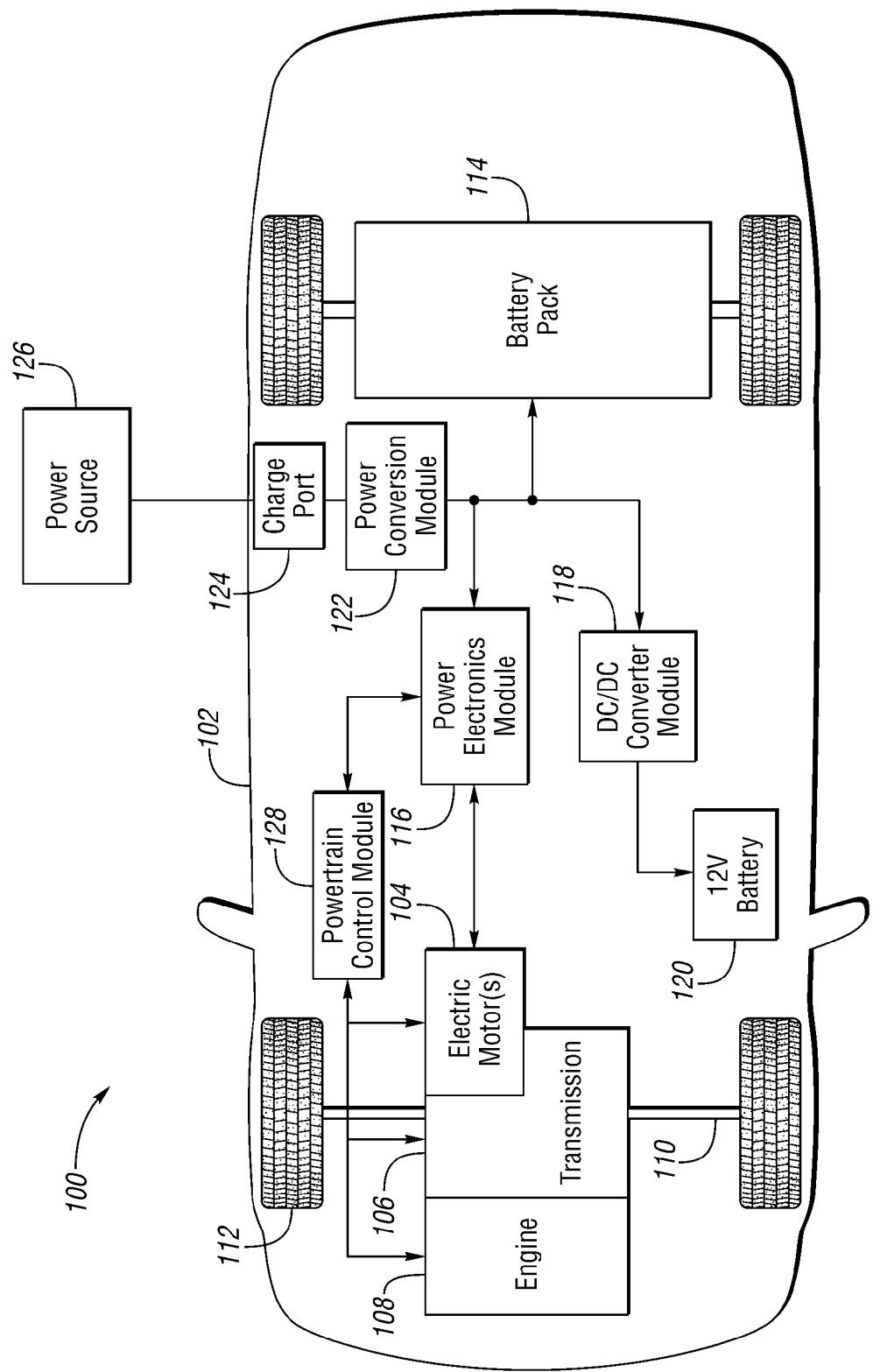
FIG. 1 illustrates an example hybrid-electric vehicle with a powertrain control module.

FIG. 1 depicts an example of a plug-in hybrid-electric vehicle. A plug-in hybrid-electric vehicle 102 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide propulsion when the engine 108 is turned on. The electric motors 104 can provide deceleration capability when the engine 108 is turned off. The electric motors 104 may be configured as electric generators and can provide fuel economy benefits by recovering energy that would normally be lost as heat in the friction braking system. The electric motors 104 may also reduce pollutant emissions since the hybrid electric vehicle 102 may be operated in electric mode under certain conditions.

The traction battery or battery pack 114 stores energy that can be used by the electric motors 104. A vehicle battery pack 114 typically provides a high voltage DC output. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 14 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle powertrain including engine, transmission, electric motors, electric generators and power electronics may be controlled by a powertrain control module (PCM) 128.

In addition to illustrating a plug-in hybrid vehicle, FIG. 1 can illustrate a battery electric vehicle (BEV) if component 108 is removed. Likewise, FIG. 1 can illustrate a traditional hybrid electric vehicle (HEV) or a power-split hybrid electric vehicle if components 122, 124, and 126 are removed.

Path forecasting and path information for a given route can be used to optimize fuel economy of a HEV by scheduling the battery State of Charge (SOC) setpoints along the route. One strategy for this optimization can be performed by viewing the overall route, optimizing each point on a route and providing a signal based on the optimized operation to the Powertrain Control Module (PCM).

Figure 2:
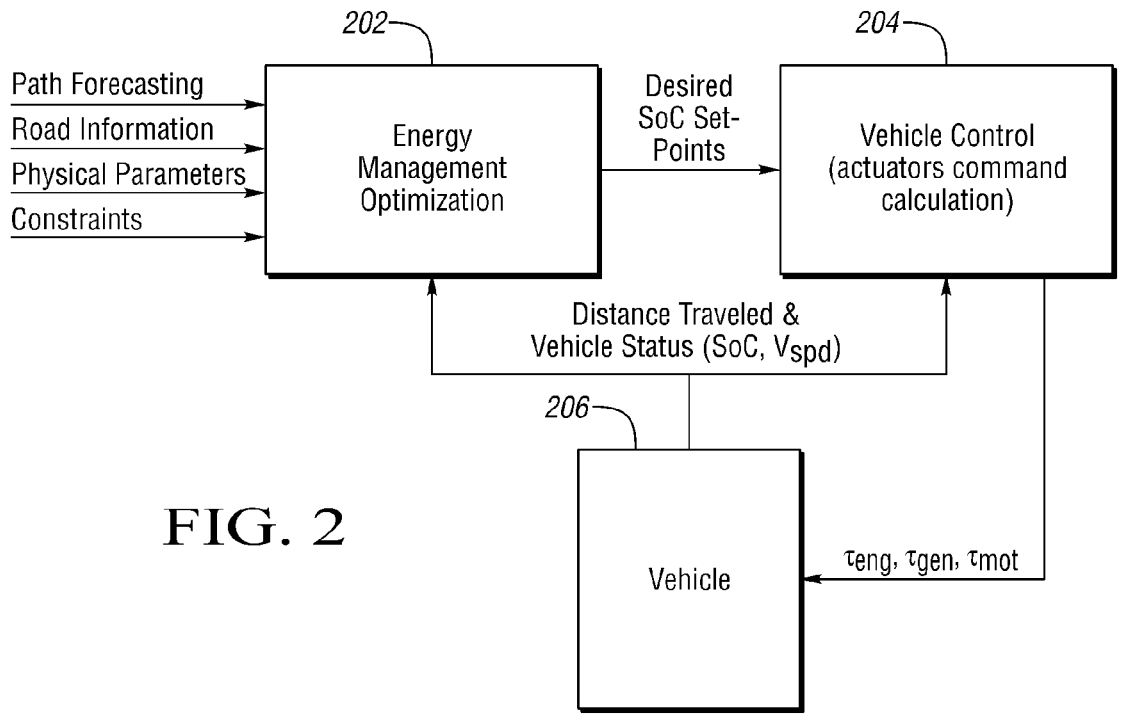
FIG. 2 is a path forecasting based energy management control system flow diagram.

One method of scheduling the battery SOC setpoints along the route is a path dependent receding horizon control for real-time HEV energy management. This allows the system to obtain the optimal battery SOC scheduling by minimizing a cost function which represents the fuel consumption for predicted drive conditions for the intended route. FIG. 2 illustrates one method of decomposing the optimal HEV control problem into two levels. The high level control (Energy Management Optimization 202) determines controls such as the desired setpoints for the battery SOC along the route based on inputs including but not limited to path forecasting, road information, physical parameters, and general system constraints. The low level control (Vehicle Control 204) tracks the battery SOC setpoints and generates the desired vehicle operation parameters (for example battery system power, engine power, rotational engine speed, and engine operation). These intermediate variables allow the Vehicle Control 204 to calculate the torque commands which are sent to the Vehicle 206 and more specifically sent to control the engine and electric machines and provide feedback of the vehicle status resulting in improved fuel economy. The requested torques (engine torque $\tau_{eng}$, generator torque $\tau_{gen}$, and motor torque $\tau_{mot}$) are communicated to the Vehicle 206 and the vehicle operation data is fed back to at least the Energy Management Optimization 202 and the Vehicle Control 204. The vehicle operation data includes but is not limited to vehicle speed $V_{spd}$, battery state of charge SOC and distance traveled.

A method to optimize the fuel consumption may require an amount of computation that is greater than the computation bandwidth available in the embedded control module. One method of resolving this computational deficient may be accomplished off-line using a more powerful remote computer system to calculate the optimal operation. It may be desirable to implement this control algorithm real-time. A real-time implementation can include an embedded control module that predicts and processes traffic, road information and driver inputs and collects current vehicle status (battery SOC, vehicle speed, etc.). This real-time implementation collects and processes the data such that the processing is without buffering delays and in which the output is representative and adaptive to the real driving conditions.

For real-time implementation of such an optimization, it may not be practical to determine the SOC setpoint for every moment in time of the route because of the extensive computation requirements. One method of solving this is to divide the route into segments. An example method of dividing the route is to time divide the route based on available computational bandwidth. One problem with this is that it does not account for characteristics of the route. Another example method is to decompose the route into segments that have similar characteristics and attributes. Then, the SOC setpoint can be scheduled for the end point of each segment based on the optimization. The second example of route segmentation shows advantages in generating a real-time fuel consumption estimation method for a given route segment.

Figure 3:
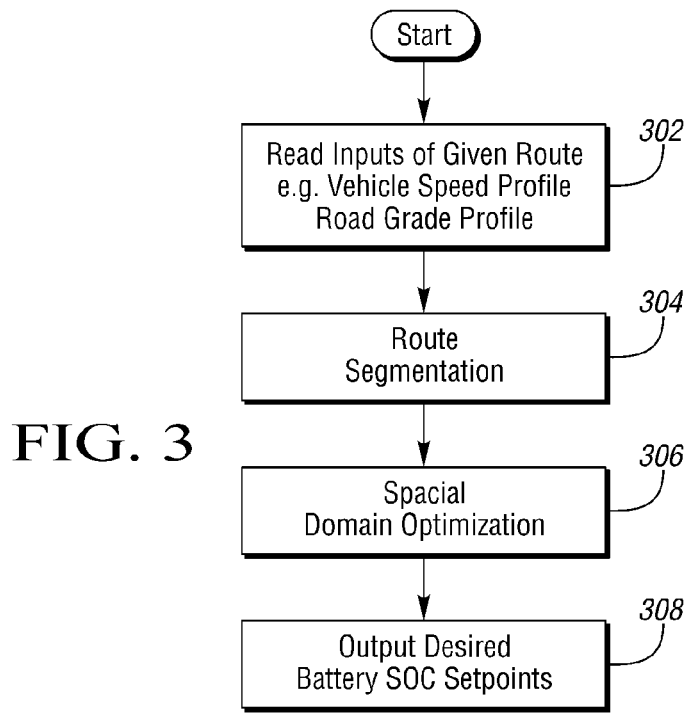
FIG. 3 is a flow chart of a spatial domain optimal hybrid control system with path forecasting.

FIG. 3 is a flow chart illustrating the overall flow to determine the desired battery SOC setpoints as used to control the electric motor(s) 104 and electric machine(s). This flow chart typically resides in the powertrain control module 128, and may be used for Energy Management Optimization 202. Block 302 is a data input block in which route preview information including but not limited to vehicle speed, road grade, traffic data, route information (traffic signs, traffic lights, posted speed limits) are input to block 302. The input route is then segmented in block 304. This segmentation may be based on user data, predicted data, or information provided wirelessly by the internet network and cloud computing. After the route is segmented, a spatial domain optimizer 306 may be used to schedule desired battery SOC setpoints by minimizing estimated fuel consumption along the route. The output of block 306 is the desired battery SOC setpoints as shown in 308 which may be used by the Vehicle Control 204 to control the electric machine(s) and electric motor(s) 104.

Figure 4:
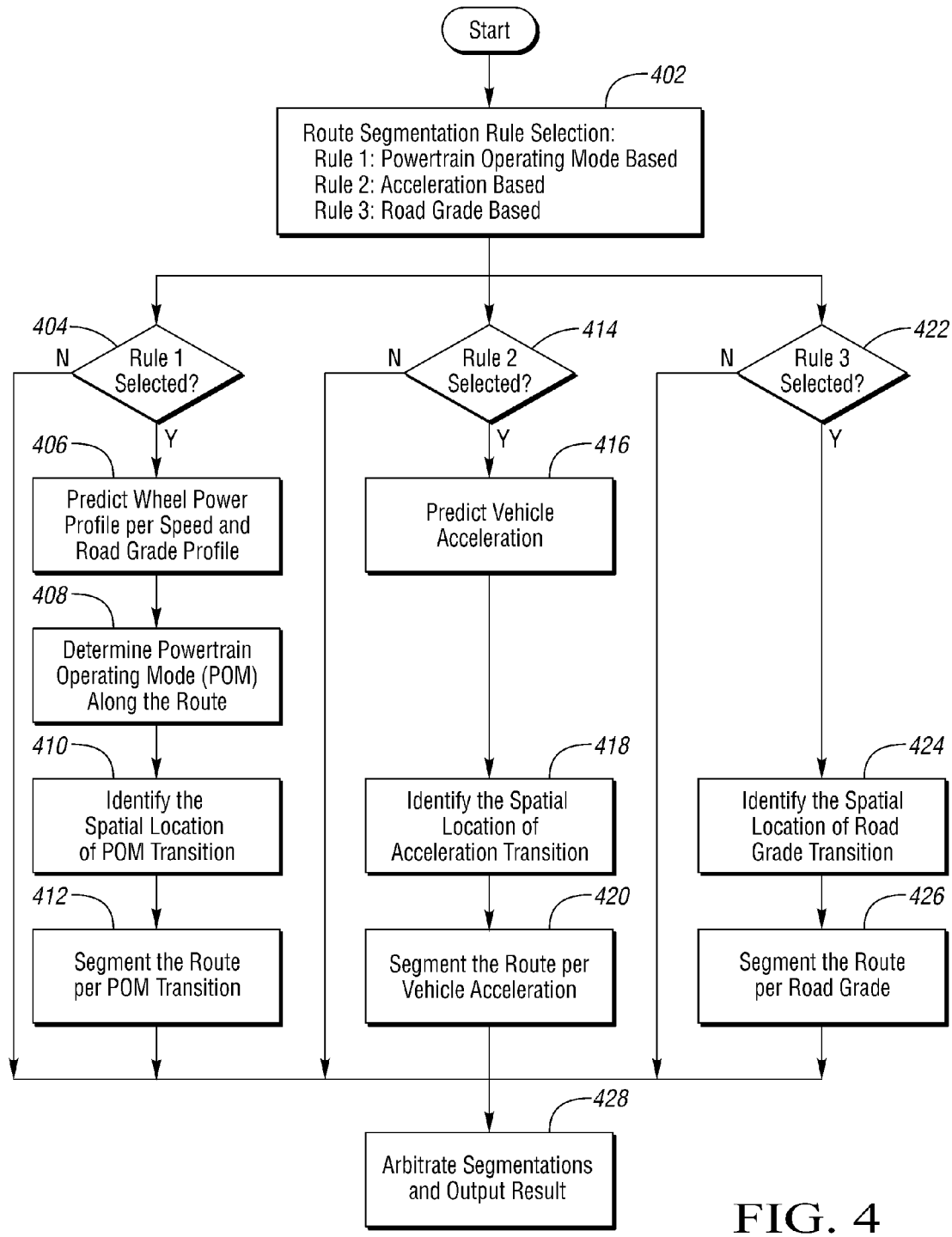
FIG. 4 is a rule based route segmentation flow chart for a spatial domain optimal hybrid control system.

FIG. 4 is the subroutine used in block 304. FIG. 4 is a rule based route segmentation flow chart used to decompose the route. Block 402 determines which rules will be used to determine the segmentation. Depending on the computational power capability available in the controller and other factors, the route can be segmented based on one, two, or all three rules. The resulting segmentations are arbitrated to determine the segmentation for the spatial domain optimization.

Rule 1 is the powertrain operating mode based rule which is selected in block 404. In this rule, the route is divided based on a change in the powertrain operating mode. The objective is to separate when the engine is off, such as in the electric vehicle mode from when the engine is on, such as in the hybrid electric vehicle mode. The result is that there is no blended powertrain operation mode such as a combination of electric vehicle mode and hybrid modes in a discrete route segment.

In rule 1, the wheel power profile is calculated in block 406 using data including vehicle speed, road grade profile, traffic data and other road characteristics such as traffic lights, traffic signs, posted speed limits, freeway ramps, etc. The predicted wheel power profile calculated in 406 is used to determine the powertrain operating mode (POM) in block 408. The POM is mapped with the spatial location in block 410 and the route is segmented in block 412 according to the POM. The powertrain mode requires at a minimum the predicted wheel power demand and vehicle speed which are the primary parameters used in the engine start or stop request determination in the low level controller. The powertrain mode change points are reasonable control points of a battery SOC. No blended mode operation within one segment is required to remain substantially constant to allow an average to be calculated based on the fuel consumption estimation for the energy management optimization. This powertrain mode based segmentation allows for the optimized SOC setpoints to be tracked by the low level controller.

Rule 2 is an acceleration based rule which is selected in block 414. In this rule, the predicted change of acceleration is used to decompose the route. If the change is above a pre-defined and calibrateable threshold, a respected spatial location of the acceleration change is identified and used for the segmentation. The predicted vehicle acceleration is performed in block 416 using vehicle speed which can be derived from data input to block 402. The predicted vehicle acceleration is mapped with the spatial location in block 418 where transitions in the vehicle acceleration are identified. The vehicle acceleration transitions are defined by criteria including static and dynamic thresholds, these thresholds include but are not limited to a vehicle acceleration (i.e. >0.5 fps$^2$), a percentage vehicle acceleration change (i.e. >5%) or a combination of these criteria or other criteria including vehicle speed (i.e. >0.5 fps$^2$ @ 0-20 mph). Based on the vehicle acceleration transitions, the route is segmented in block 420. This rule can be easily extended to identify route segments with standstill vehicle speed only.

Rule 3 is a road grade based rule which is selected in block 422. In this rule, the segmentation is based on road segments which have a substantially similar road grade. If the road grade change is above a pre-defined and calibrateable threshold, a respected spatial location of the road grade transition is identified in block 424. The road grade transitions are defined by criteria including static and dynamic thresholds, these thresholds include but are not limited to a road grade (i.e. >0.05%), a percentage road grade change (i.e. >5%) or a combination of these criteria or other criteria including vehicle speed (i.e. >0.05% @ 0-20 mph). Based on the road grade transitions, the route is segmented in block 426. The road grade change is determined by either the road grade itself or the derivative of the road grade. The road grade can be used when piecewise constant road grade along the route is provided. The derivative of road grade can be used when the road grade provided is more dynamic.

With the use of multiple rules, the results of these rules are forwarded to block 428 where arbitration is used to determine the segmentation, which is forwarded to the spatial domain optimization block 306. The arbitration may superimpose the results of one rule with the results of other rules such that common points are represented once as well as each individual point generated by either rule. The resultant superposition, which arises from the act of superposing, allows for the capture of all points identified by the rules to be used for segmentation. For example, if Rule 2 identifies points "A" and "B" and Rule 3 identifies points "B" and "C," a superposition of these points will result in a route segmented by points "A," "B" and "C." Rule 2 and 3, which are points of change of acceleration or road grade can be identified between adjacent route segments, which are reasonable locations for SOC control points. In addition, each route segment will have relatively consistent acceleration and road grade, therefore consistent engine operating and fuel flow rate. This is necessary to guarantee the accuracy of average power based real-time fuel consumption estimation.

Although FIG. 4 illustrates 3 rules, other factors can be considered to segment the route. The other factors include a minimum engine on time used to restrict the minimum length of the HEV segment, a reduction in the total number of route segments used in the optimization or a minimum length of each segment.

The optimization can be formulated to minimize the fuel consumption along the route using Dynamic Programming (DP). The nonlinear DP problem is solved using the state and control variables (which are the battery SOC at the beginning and the end of each segment). The state of control variables are quantized into a finite grid in which the fuel consumption is estimated at these SOC grid points for each segment. The fuel consumption estimation of each segment is essential to DP optimization. Segmentation affects the accuracy of the fuel consumption estimation; ideally segmentation for fuel estimation may be used for optimization. However, using the same segmentation for both optimization and fuel consumption estimation may increase the number of segments, which will increase the computation power requirement exponentially in DP optimization. A solution to the conflict of the computation power requirement and the fuel consumption estimation accuracy is when the segmentation for optimization is used as the base for fuel consumption estimation with a subsequent stage of fuel consumption estimation. If a segment's accuracy is not acceptable for fuel consumption estimation, a further refinement generating sub-segments can be performed with the total fuel consumption estimate for the segment being the sum of the estimates for the sub-segments. This strategy will improve the accuracy of the fuel consumption estimation without increasing computation power requirements because the number of segments for DP optimization is not increased.

Figure 5:
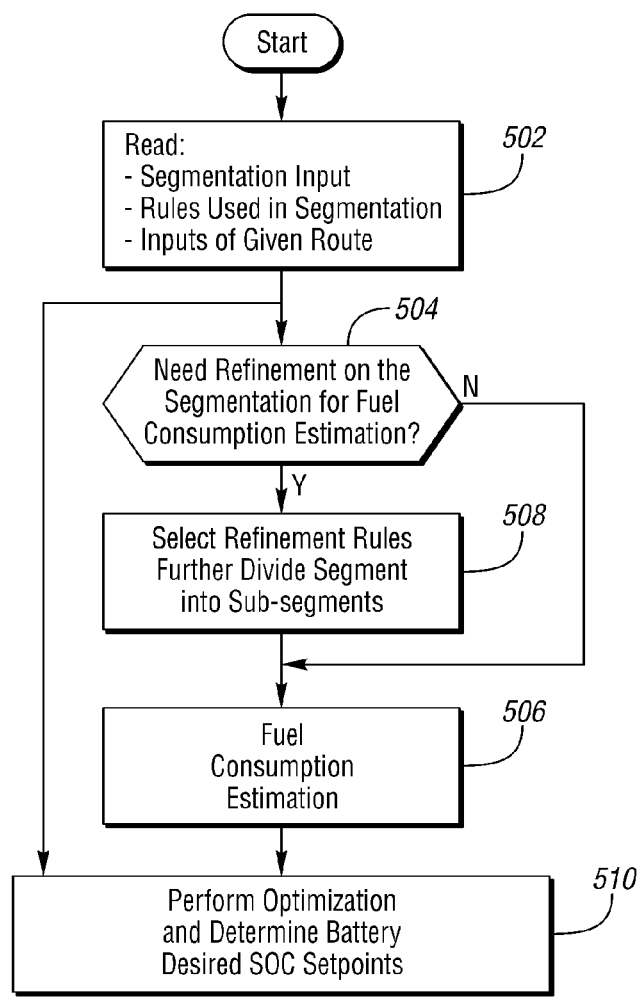
FIG. 5 is a spatial domain optimization flow chart for a spatial domain optimal hybrid control system.

FIG. 5 is a spatial domain optimization flow chart which resides in block 306. Route segmentation and route segmentation rules used in FIG. 4 are received in block 502. Block 504 decides if the current segment can be used to calculate the fuel consumption estimation for that segment. If it is determined that fuel consumption can be calculated accurately using the current segmentation, the fuel consumption is then calculated in block 506. If it is determined that the fuel consumption is not able to be calculated using the current segmentation, additional refinement rules are provided and the route segments are analyzed to determine if each current segment can be divided into sub-segments in block 508. Once the fuel consumption estimation is determined in block 506, the spatial domain optimization is performed and battery SOC setpoints are determined in block 510. The output of the optimization is the desired battery SOC setpoints at the end of each segment. In contrast to instantaneous time based optimization, this optimization is referred as spatial domain optimization because the segmentation is spatial domain based.

Figure 6:
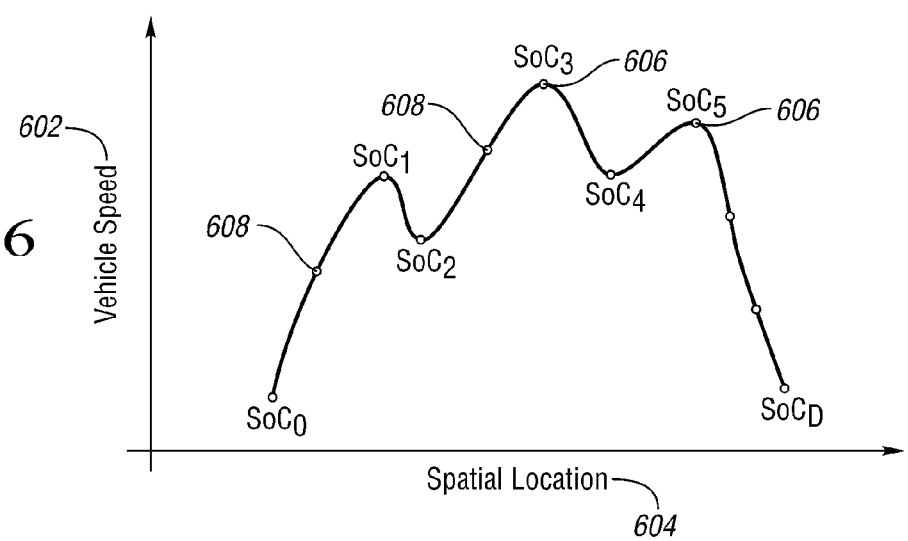
FIG. 6 illustrates an example segmentation of a predetermined route.

FIG. 6 is a graph of vehicle speed 602 with respect to a geographic or spatial location 604. In this illustration, a predetermined route is divided into segments based on vehicle speed inflection criteria and may relate to a segment start or endpoint 606. If the segment is divided into sub-segments as illustrated in FIG. 5, additional sub-endpoints or sub-segments 608 can be included or superimposed upon the original segmentation to improve the accuracy.

Conventional HEVs buffer fuel energy and recover kinematic energy in electric form to improve the overall vehicle system operating efficiency. The fuel is the only energy source. For PHEVs, there is an additional source of energy—the amount of electric energy deposited in the battery from the grid during battery charge events. A power management strategy for PHEVs has the potential to allocate the drive power demand between the two energy sources to achieve better fuel economy or improved drivability while still satisfying the other objectives. While conventional HEVs are operated to maintain the battery state of charge (SOC) around a constant level, PHEVs use as much pre-saved battery electric (grid) energy as possible before the next battery charge event, i.e., it is desirable to fully use the relatively cheap grid supplied electric energy after each plug-in charge event. After the battery SOC depletes to a lowest conservative level, the PHEV operates as a conventional HEV operating about the lowest conservative level for the battery.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, FLASH devices, MRAM devices and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery;
   an engine;
   an electric machine; and
   a controller programmed to, for each of a plurality of route segments having an endpoint defined by a location and a target battery state of charge (SOC), operate the engine and electric machine to achieve the target battery SOC, wherein the endpoints are a superposition of a first set of predicted engine on/off route transition points and a second set of predicted vehicle acceleration route transition points that is derived independently of the first set.

2. The vehicle of claim 1, wherein the endpoints are further a superposition of a third set of predicted road grade route transition points derived independently of the first and second sets.

3. A control system comprising:
   a controller programmed to, for each of a plurality of route segments having an endpoint defined by a location and a target battery state of charge (SOC), operate a powertrain to achieve the target battery SOC, the endpoints being a superposition of a first set of predicted engine on/off route transition points and a second set of predicted vehicle acceleration route transition points that is derived independently of the first set.

4. The system of claim 3, wherein the endpoints are further a superposition of a third set of predicted road grade route transition points derived independently of the first and second sets.

5. The system of claim 3, wherein each of the segments includes a superposition of sub-endpoints based on a fuel consumption estimation for the segment.

* * * * *